(12) United States Patent
Madani et al.

(10) Patent No.: US 7,756,845 B2
(45) Date of Patent: Jul. 13, 2010

(54) SYSTEM AND METHOD FOR LEARNING A WEIGHTED INDEX TO CATEGORIZE OBJECTS

(75) Inventors: Omid Madani, San Gabriel, CA (US); Michael James Connor, Champaign, IL (US)

(73) Assignee: Yahoo! Inc., Sunnyvale, CA (US)

( * ) Notice: Subject to any disclaimer, the term of this patent is extended or adjusted under 35 U.S.C. 154(b) by 241 days.

(21) Appl. No.: 11/648,323

(22) Filed: Dec. 28, 2006

(65) Prior Publication Data

US 2008/0162385 A1 Jul. 3, 2008

(51) Int. Cl.
*G06F 17/30* (2006.01)

(52) U.S. Cl. .................... 707/696; 707/748

(58) Field of Classification Search .......... 707/696, 707/748
See application file for complete search history.

(56) References Cited

U.S. PATENT DOCUMENTS

| | | | | |
|---|---|---|---|---|
| 4,024,508 | A * | 5/1977 | Bachman et al. ............... | 1/1 |
| 5,845,278 | A * | 12/1998 | Kirsch et al. .................. | 1/1 |
| 6,226,650 | B1 * | 5/2001 | Mahajan et al. ............... | 1/1 |
| 6,430,563 | B1 * | 8/2002 | Fritz et al. .................... | 1/1 |
| 6,606,659 | B1 * | 8/2003 | Hegli et al. ............. | 709/225 |
| 6,629,096 | B1 * | 9/2003 | Reddy ........................ | 1/1 |
| 6,745,189 | B2 * | 6/2004 | Schreiber .................... | 1/1 |
| 6,754,648 | B1 * | 6/2004 | Fittges et al. ................. | 1/1 |
| 6,792,418 | B1 * | 9/2004 | Binnig et al. ................. | 1/1 |
| 7,007,006 | B2 * | 2/2006 | Zilio et al. ................... | 1/1 |
| 7,051,017 | B2 * | 5/2006 | Marchisio .................... | 1/1 |
| 7,113,935 | B2 * | 9/2006 | Saxena ........................ | 1/1 |
| 7,139,778 | B2 * | 11/2006 | Chaudhuri et al. ............ | 1/1 |
| 7,155,442 | B2 * | 12/2006 | Carlin et al. ................. | 1/1 |
| 2008/0005106 | A1 * | 1/2008 | Schumacher et al. ....... | 707/6 |
| 2008/0219564 | A1 * | 9/2008 | Covell et al. ............ | 382/224 |

OTHER PUBLICATIONS

J. T. Goodman, A Bit of Progress in Language Modeling, Computer Speech and Language, 15(4):403-434, Oct. 2001.
J. Z. Wang, J. Li, and G. Wiederhold, SIMPLIcity: Semantics-sensitive Integrated Matching for Picture Libraries, IEEE Transactions on Pattern Analysis and Machine Intelligence.
R. Rosenfeld, Two Decades of Statistical Language Modeling: Where Do We Go From Here, IEEE, 88(8), 2000.
Y. Even-Zohar and D. Roth, A Classification Approach to Word Prediction, In Annual meeting of the North American Association of Computational Linguistics (NAACL), 2000.

* cited by examiner

*Primary Examiner*—Don Wong
*Assistant Examiner*—Kim T Nguyen
(74) *Attorney, Agent, or Firm*—Hickman Palermo Truong & Becker LLP (57) ABSTRACT

An improved system and method is provided for learning a weighted index to categorize objects using ranked recall. In an offline embodiment, a learning engine may learn a weighted index for classifying objects using ranked recall by training during an entire initial pass of a training sequence of a collection of objects. In an online embodiment, a learning engine may learn a weighted index for classifying objects using ranked recall by dynamically updating the weighted index as each instance of the collection of objects may be categorized. Advantageously, an instance of a large collection of objects may be accurately and efficiently recalled for many large scale applications with hundreds of thousands of categories by quickly identifying a small set of candidate categories for the given instance of the object.

20 Claims, 6 Drawing Sheets

FIG. 6

SYSTEM AND METHOD FOR LEARNING A WEIGHTED INDEX TO CATEGORIZE OBJECTS

FIELD OF THE INVENTION

The invention relates generally to computer systems, and more particularly to an improved system and method for efficiently learning a weighted index to efficiently categorize objects.

BACKGROUND OF THE INVENTION

Many computational tasks can be formulated as problems that require learning and classification, in particular when the number of categories is large. For example, in a number of existing text categorization domains, such as categorizing web pages into topic hierarchies, the number of categories currently range in the hundreds of thousands. In the task of language modeling, each possible word or phrase to be predicted may be viewed as its own category, thus the number of categories can easily exceed hundreds of thousands. For papers on language modeling, see for example, R. Rosenfeld, *Two Decades of Statistical Language Modeling: Where Do We Go From Here*, IEEE, 88(8), 2000; J. T. Goodman, *A Bit of Progress in Language Modeling*, Computer Speech and Language, 15(4):403-434, October 2001; and Y. Even-Zohar and D. Roth, *A Classification Approach to Word Prediction*, In Annual meeting of the North American Association of Computational Linguistics (NAACL), 2000. For a paper that also discusses large scale text categorization, see for example: O. Madani and W. Greiner, *Learning When Concepts Abound*, Technical Report, Yahoo! Research, 2006. Similarly, visual categories are numerous. See for example, J. Z. Wang, J. Li, and G. Wiederhold, *SIMPLIcity: Semantics-sensitive Integrated Matching for Picture Libraries*, IEEE Transactions on Pattern Analysis and Machine Intelligence, 23(9):947.963, 2001. In addition, decades of research in cognitive psychology has stressed the importance of categories (concepts) to basic cognition. See for example, G. L. Murphy, *The Big Book of Concepts*, MIT Press, 2002. The number of categories necessary for general human level intelligence can easily exceed millions. Developing successful learning and classification techniques that can scale to a possibly unbounded number of instances as well as myriad categories has the potential to significantly impact applications as well as contribute to our understanding of intelligence. However, efficient learning and classification of instances from large collections of objects is a difficult task in the face of myriad categories.

An important subproblem is the recall problem, where on presentation of an instance, a small set of candidate categories should be quickly identified and output without missing the true categories. Typically an instance is represented by a vector of feature values. Accurately and efficiently reducing the number of categories drastically to a small set of candidate categories that include the right category for the instance requires both high recall and high precision. Recently, an approach based on learning an inverted index from features to categories was explored. See O. Madani and W. Greiner, *Learning When Concepts Abound*, Technical Report, Yahoo! Research, 2006. In that work, classifiers corresponding to the retrieved categories could be applied for precise categorization of the instance. Unfortunately, this approach relies substantially on classifiers. Although functional, training and applying classifiers take time and space. A learning and categorization method that does not require classifiers but has similar or better performance on categorization accuracy would be very useful.

SUMMARY OF THE INVENTION

Briefly, the present invention provides a system and method for efficiently learning a weighted index to efficiently categorize objects. To do so, a system and method are provided for learning a weighted index mapping features of objects to categories. A method for ranked recall or ranked retrieval may be provided for retrieval and ranking candidate categories using the weighted index for object categorization. This weighted index can then be used for efficient categorization of objects. For example, after ranked recall, the top ranked category can be the category assigned to the object. In an embodiment, a learning engine may include an operably coupled index generator for creating the index and a recall engine for providing ranked recall to retrieve and rank a list of candidate categories. The ranked list of categories may be output for use by an application.

In an offline embodiment, the learning engine may learn the weighted index by training during an entire initial pass on a collection of training objects. An initial index may be created without any weights for mapping features to categories. Weights mapping features to categories may be calculated by determining the proportion of the number of times a feature occurs in the objects of the category to the number of times the feature occurs in the objects in the training collection. The index may be updated accordingly using the calculated weights mapping the respective features to the corresponding categories.

In an online embodiment, the learning engine may learn a weighted index for classifying objects using ranked recall and by dynamically updating the weighted index as each instance of the collection of training objects may be processed. A list of candidate categories may be determined for an instance of a given object by accumulating scores from weights for categories indexed by features of the object using the current index. The list of candidate categories may be ranked by the accumulated scores of weights. And the index may then be updated, by changing weights, for features of the object. Thus, in the online embodiment, the index may be continually used and updated as training objects are processed.

The present invention may support many applications for performing categorization using the weighted index for categorizing objects. For example, a text categorization application may use the present invention to categorize web pages into topics. Or an editing application may use the present invention for word prediction. The learning and use of index is especially useful for large scale applications with hundreds of thousands of categories.

Other advantages will become apparent from the following detailed description when taken in conjunction with the drawings, in which:

DETAILED DESCRIPTION

Exemplary Operating Environment

Figure 1:
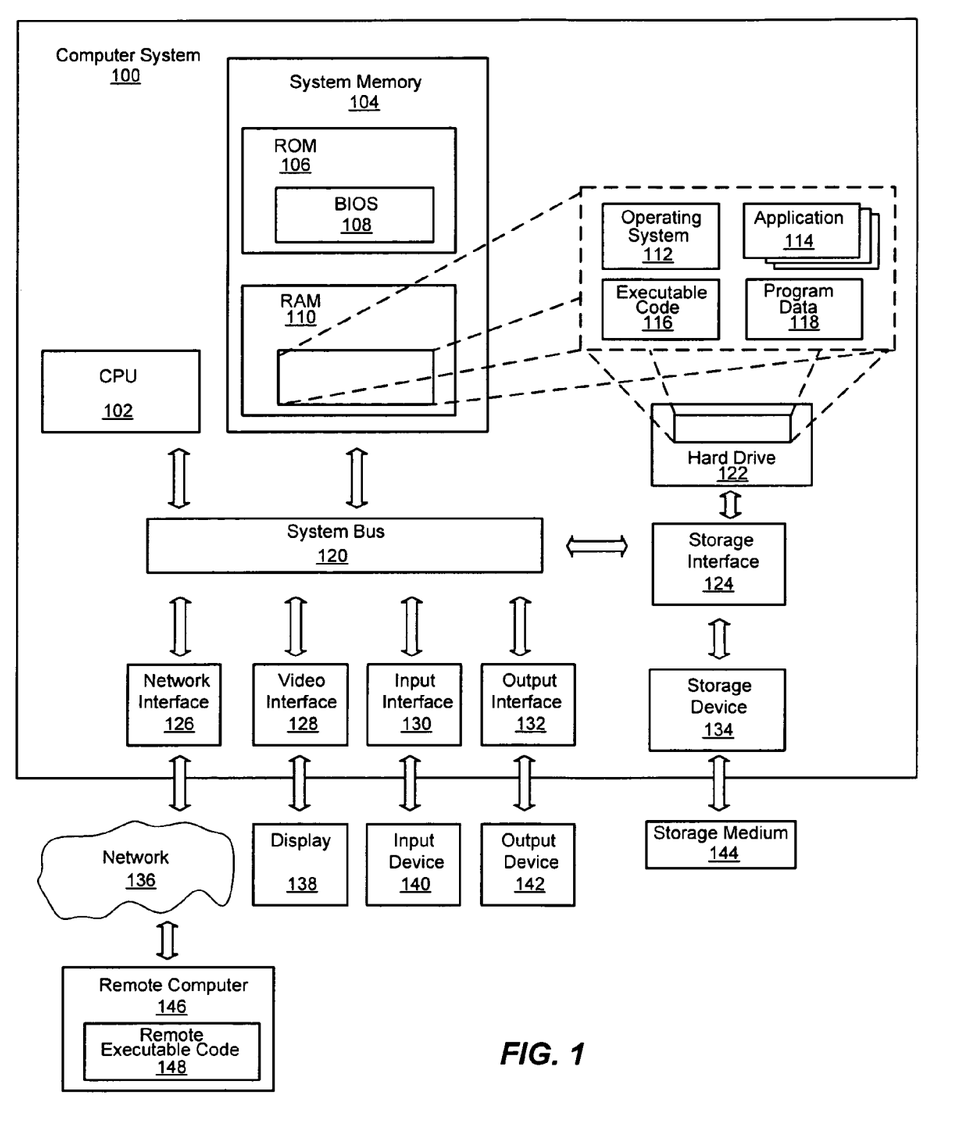
FIG. 1 is a block diagram generally representing a computer system into which the present invention may be incorporated.

FIG. 1 illustrates suitable components in an exemplary embodiment of a general purpose computing system. The exemplary embodiment is only one example of suitable components and is not intended to suggest any limitation as to the scope of use or functionality of the invention. Neither should the configuration of components be interpreted as having any dependency or requirement relating to any one or combination of components illustrated in the exemplary embodiment of a computer system. The invention may be operational with numerous other general purpose or special purpose computing system environments or configurations.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention may include a general purpose computer system 100. Components of the computer system 100 may include, but are not limited to, a CPU or central processing unit 102, a system memory 104, and a system bus 120 that couples various system components including the system memory 104 to the processing unit 102. The system bus 120 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer system 100 may include a variety of computer-readable media. Computer-readable media can be any available media that can be accessed by the computer system 100 and includes both volatile and nonvolatile media. For example, computer-readable media may include volatile and nonvolatile computer storage media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer system 100. Communication media may include computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. For instance, communication media includes wired media such as a wired network or direct-wired connection, and wireless media such as acoustic, RF, infrared and other wireless media.

The system memory 104 includes computer storage media in the form of volatile and/or nonvolatile memory such as read only memory (ROM) 106 and random access memory (RAM) 110. A basic input/output system 108 (BIOS), containing the basic routines that help to transfer information between elements within computer system 100, such as during start-up, is typically stored in ROM 106. Additionally, RAM 110 may contain operating system 112, application programs 114, other executable code 116 and program data 118. RAM 110 typically contains data and/or program modules that are immediately accessible to and/or presently being operated on by CPU 102.

The computer system 100 may also include other removable/non-removable, volatile/nonvolatile computer storage media. By way of example only, FIG. 1 illustrates a hard disk drive 122 that reads from or writes to non-removable, nonvolatile magnetic media, and storage device 134 that may be an optical disk drive or a magnetic disk drive that reads from or writes to a removable, a nonvolatile storage medium 144 such as an optical disk or magnetic disk. Other removable/non-removable, volatile/nonvolatile computer storage media that can be used in the exemplary computer system 100 include, but are not limited to, magnetic tape cassettes, flash memory cards, digital versatile disks, digital video tape, solid state RAM, solid state ROM, and the like. The hard disk drive 122 and the storage device 134 may be typically connected to the system bus 120 through an interface such as storage interface 124.

The drives and their associated computer storage media, discussed above and illustrated in FIG. 1, provide storage of computer-readable instructions, executable code, data structures, program modules and other data for the computer system 100. In FIG. 1, for example, hard disk drive 122 is illustrated as storing operating system 112, application programs 114, other executable code 116 and program data 118. A user may enter commands and information into the computer system 100 through an input device 140 such as a keyboard and pointing device, commonly referred to as mouse, trackball or touch pad tablet, electronic digitizer, or a microphone. Other input devices may include a joystick, game pad, satellite dish, scanner, and so forth. These and other input devices are often connected to CPU 102 through an input interface 130 that is coupled to the system bus, but may be connected by other interface and bus structures, such as a parallel port, game port or a universal serial bus (USB). A display 138 or other type of video device may also be connected to the system bus 120 via an interface, such as a video interface 128. In addition, an output device 142, such as speakers or a printer, may be connected to the system bus 120 through an output interface 132 or the like computers.

The computer system 100 may operate in a networked environment using a network 136 to one or more remote computers, such as a remote computer 146. The remote computer 146 may be a personal computer, a server, a router, a network PC, a peer device or other common network node, and typically includes many or all of the elements described above relative to the computer system 100. The network 136 depicted in FIG. 1 may include a local area network (LAN), a wide area network (WAN), or other type of network. Such networking environments are commonplace in offices, enterprise-wide computer networks, intranets and the Internet. In a networked environment, executable code and application programs may be stored in the remote computer. By way of example, and not limitation, FIG. 1 illustrates remote executable code 148 as residing on remote computer 146. It will be appreciated that the network connections shown are exemplary and other means of establishing a communications link between the computers may be used.

Ranked Recall: Using a Weighted Index to Categorize Objects

Ranked recall or ranked retrieval may be used to output a ranking of categories given an object with its features as input to the system that contains a weighted index. The ranking and the scores can be used for assigning categories to the object in order to perform categorization of the object. For example, the top ranked category can be assigned as the only category of the object, or the scores can be mapped to probabilities, and categories that obtain probabilities greater than a threshold may be reported along with their probabilities.

In general, ranked recall may use a weighted index to retrieve and rank categories, given an object with features. The index mapping objects' features to categories may be viewed as a weighted bipartite graph where the nodes on one side correspond to features, and each such node may be connected to zero or more nodes on the other side that may represent categories. Furthermore, consider $w_{f,c}$ to denote the weight in the index mapping feature f to category c. Viewing the index as a bipartite graph, $w_{f,c}$ may also be considered to denote the weight of the edge connecting feature f to category c. On presentation of an object (with a vector of features), a list of candidate categories may be determined by accumulating scores of weights for each category in a list of categories indexed by each feature of the object. For each feature f in the vector x for object in an embodiment, the corresponding edge weights of the highest weighted j categories connected to each feature may be added to a running total for each respective category. And the list of candidate categories may be ranked by their accumulated scores. In an embodiment, ranked recall of candidate categories may generally be implemented by the following algorithm using the index mapping features to categories:

```
Algorithm RankedRetrieval(x,j)
   1. , /* initialize category scores */
   2. For each feature f ∈ x:
      For the first j highest weight categories connected
      to f:
         2.1. s_c←s_c+w_{f,c} /* update accumulated scores */
   3. Sort the categories and return the ranked list of
      categories.
```

In this embodiment, the algorithm may also take in an optional parameter j, which is a bound on the maximum number of categories a single feature can contribute to the list of retrieved categories.

In another embodiment, the features may have values in an instance, instead of just being Boolean, and the expression $w_{f,c} \leftarrow w_{f,c} * x_f$ may be used for accumulating scores, where $x_f$ denotes the weight or value of feature f in instance vector x.

Learning a Weighted Index to Categorize Objects Ranked Recall

The present invention is generally directed towards a system and method for learning a weighted index to categorize objects using ranked recall. More particularly, a weighted index mapping features to categories may be learned efficiently given a training set of objects for which the correct categories are given. The learned index is then used to obtain good rankings of a relatively small number of candidate categories for each future object presented to the system to categorize. The present invention may be used to learn a weighted index for a training set of any type of objects for classification including documents, web pages, queries, images, and so forth.

Moreover, the system and method may learn a weighted index for classifying objects using ranked recall either offline by training over an entire initial pass of a training sequence of a collection of objects or online by dynamically updating the weighted index as each instance of the collection of training objects is processed.

As will be seen, learning a weighted index for classifying objects using ranked recall may be applied by many large scale applications with hundreds of thousands of categories. As will be understood, the various block diagrams, flow charts and scenarios described herein are only examples, and there are many other scenarios to which the present invention will apply.

Figure 2:
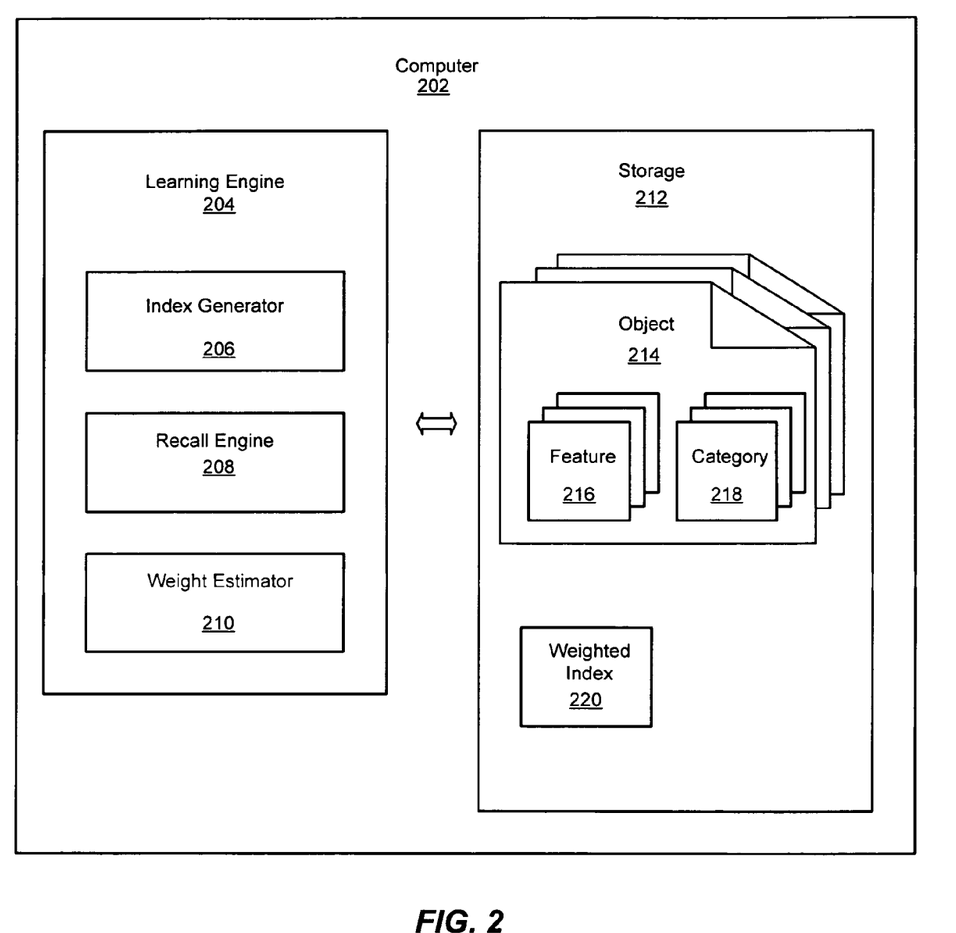
FIG. 2 is a block diagram generally representing an exemplary architecture of system components for learning a weighted index to categorize objects using ranked recall, in accordance with an aspect of the present invention.

Turning to FIG. 2 of the drawings, there is shown a block diagram generally representing an exemplary architecture of system components for learning a weighted index to categorize objects using ranked recall. Those skilled in the art will appreciate that the functionality implemented within the blocks illustrated in the diagram may be implemented as separate components or the functionality of several or all of the blocks may be implemented within a single component. For example, the functionality for the weight estimator 210 may be included in the same component as the index generator 206. Or the functionality of the recall engine 208 may be implemented as a separate component from the learning engine 204.

In various embodiments, a computer 202, such as computer system 100 of FIG. 1, may include a learning engine 204 operably coupled to storage 212. In general, the learning engine 204 may be any type of executable software code such as a kernel component, an application program, a linked library, an object with methods, and so forth. The storage 212 may be any type of computer-readable media and may store objects 214, that may include a set of features 216 and a set of categories 218, and a weighted index 220 mapping features to categories.

The learning engine 204 may learn a weighted index 220 mapping features 216 of objects 214 to categories for efficiently obtaining a good ranking of the candidate categories. In an embodiment, the objects 214 may be represented by a set of features and a set of categories. The learning engine 204 may include an index generator 206 for creating a weighted index mapping features to a set of categories, a recall engine 208 for providing a ranked recall of categories indexed by features of an object, and a weight estimator 210 for determining weights representing how well an object may be classified in various categories by its features. Each of these modules may also be any type of executable software code such as a kernel component, an application program, a linked library, an object with methods, or other type of executable software code. The learning engine 204 may learn a weighted index for classifying objects using ranked recall either offline by training during an entire initial pass of a training sequence of a collection of objects or online by dynamically updating the weighted index as each instance of the collection of objects is incrementally processed.

There are many applications which may use the present invention for performing ranked recall using the weighted index to categorizing objects. For example, a text categorization application may use the present invention to categorize web pages in topic hierarchies. Or an editing application may use the present invention for word prediction. Furthermore, those skilled in the art will appreciate that the present invention may also be used to categorize objects when the categories form a hierarchy, rather than using a hierarchical method for learning the categories which may require training classifiers for each level of the hierarchy and may result with decreased performance due to unnecessary intermediate categories on long category paths.

Figure 3:
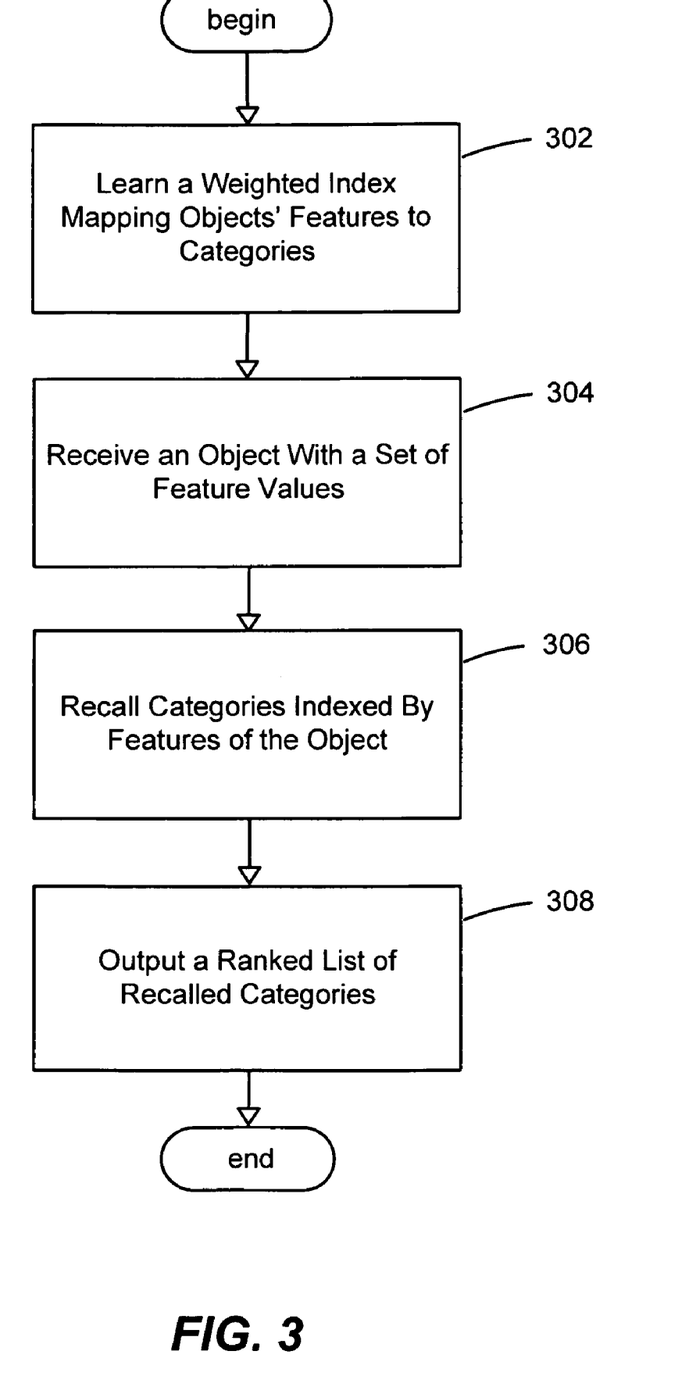
FIG. 3 is a flowchart generally representing the steps undertaken in one embodiment for learning a weighted index to categorize objects using ranked recall, in accordance with an aspect of the present invention.

FIG. 3 presents a flowchart generally representing the steps undertaken in one embodiment for learning a weighted index to categorize objects using ranked recall. At step 302, a weighted index mapping objects' features to categories may be learned. In an offline embodiment for learning a weighted index mapping objects' features to categories, a training set S of objects may be provided where each object in the set S of instances may be represented by a vector of feature values and a set of categories to which the instance may belong. An initial pass of the instances in set S may be made to update the index with a weight for each feature and each category that represents the proportion of the number of times each feature occurs in each category to the number of times the feature occurs in the objects of the collection. Then some of the weights may be set to 0 if the proportion may be below a threshold. In an online embodiment, each object in a set S of instances may be represented by a vector of feature values and the weights in the index mapping features to categories may be dynamically adjusted. The features of an instance in S may be used to generate a list of candidate categories by performing a lookup in the index mapping features to categories using ranked recall. A weight for each feature and each true category may then be calculated and used to update the index for the index weight mapping the corresponding feature to the corresponding category.

In either embodiment for learning a weighted index mapping objects' features to categories, the index mapping objects' features to categories may be viewed as a weighted bipartite graph where the nodes on one side corresponding to features may connected to zero or more nodes on the other side corresponding to categories. Once a weighted index mapping objects' features to categories is learned, future objects can be categorized. For instance, an object with a set of feature values may be received at step 304 and categories indexed by features of the object may be rank recalled at step 306. A ranked list of recalled categories may then be output at step 308 and processing may be finished for learning a weighted index to categorize objects using ranked recall.

Figure 4:
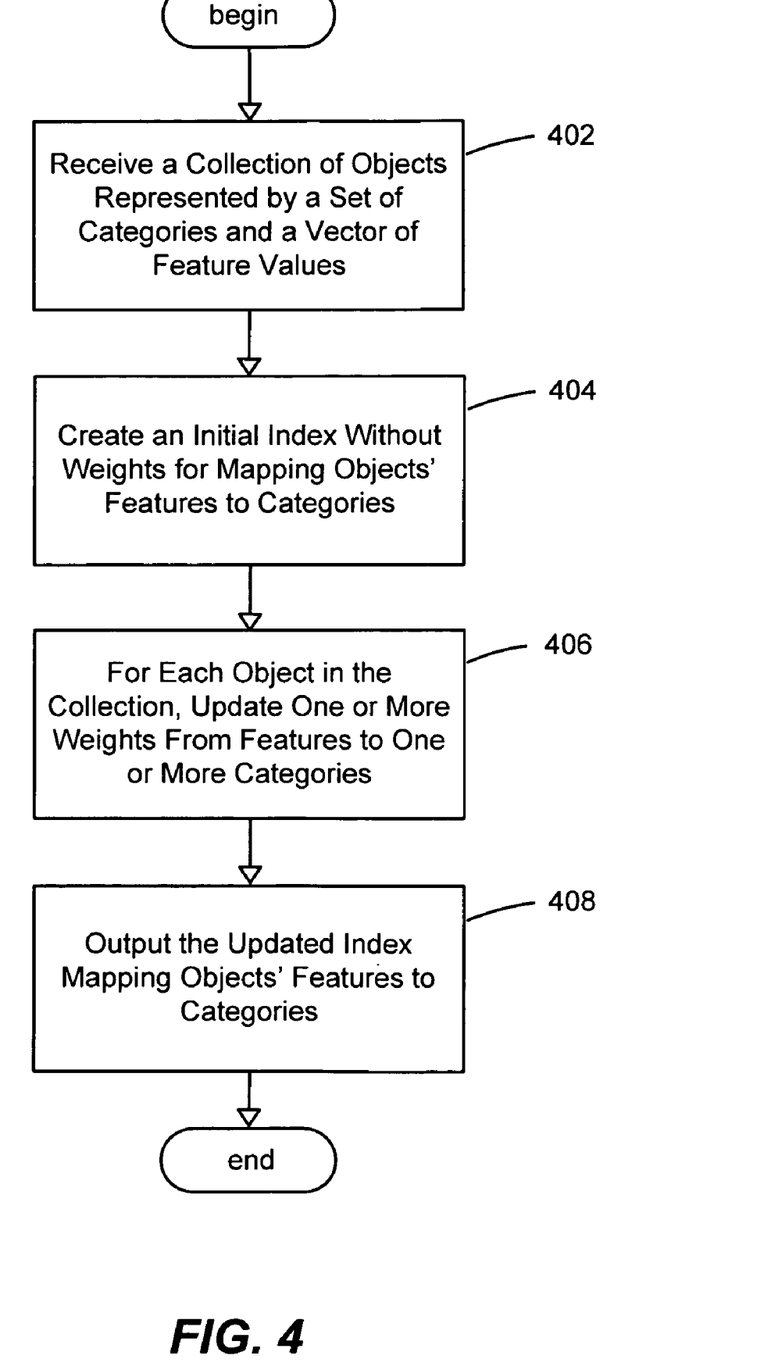
FIG. 4 is a flowchart generally representing the steps undertaken in an offline embodiment for learning a weighted index mapping objects' features to categories, in accordance with an aspect of the present invention.

FIG. 4 presents a flowchart generally representing the steps undertaken in an offline embodiment for learning a weighted index mapping objects' features to categories. At step 402, a collection of objects with each object represented by a set of feature values and a set of categories may be received. A feature may be considered active in an instance if the feature may have a positive value. For learning the index, features may be treated in an embodiment as boolean, either active or not. Therefore, an instance x may represent a set of active features. Also consider $c_x$ to denote the set of true categories of x, which is available during training. Therefore the set $c_x$ may have one or more categories. Furthermore, consider $w_{f,c}$ to denote the weight in the index mapping feature f to category c. Viewing the index as a bipartite graph, $w_{f,c}$ may also be considered to denote the weight of the edge connecting feature f to category c.

At step 404, an initial index without weights may be created. Initially, the weights in the index mapping features to categories may be zero, and the edges or connections along with their weights may be learned. At step 406, weights representing the mapping of features to categories may be updated in the index using each object in the collection of training objects. In an embodiment, a weight may be determined for each feature and each category that represents the proportion of the number of times each feature occurs in each category to the number of times the feature occurs in the objects of the collection. This can be viewed as the conditional probability of an instance belonging to a category c given that the instance has feature f: P(c|f). After the weights may be updated in the index, the updated weighted index mapping objects' features to categories may be output at step 408 and processing may be finished for learning a weighted index mapping objects' features to categories in an offline embodiment.

Figure 5:
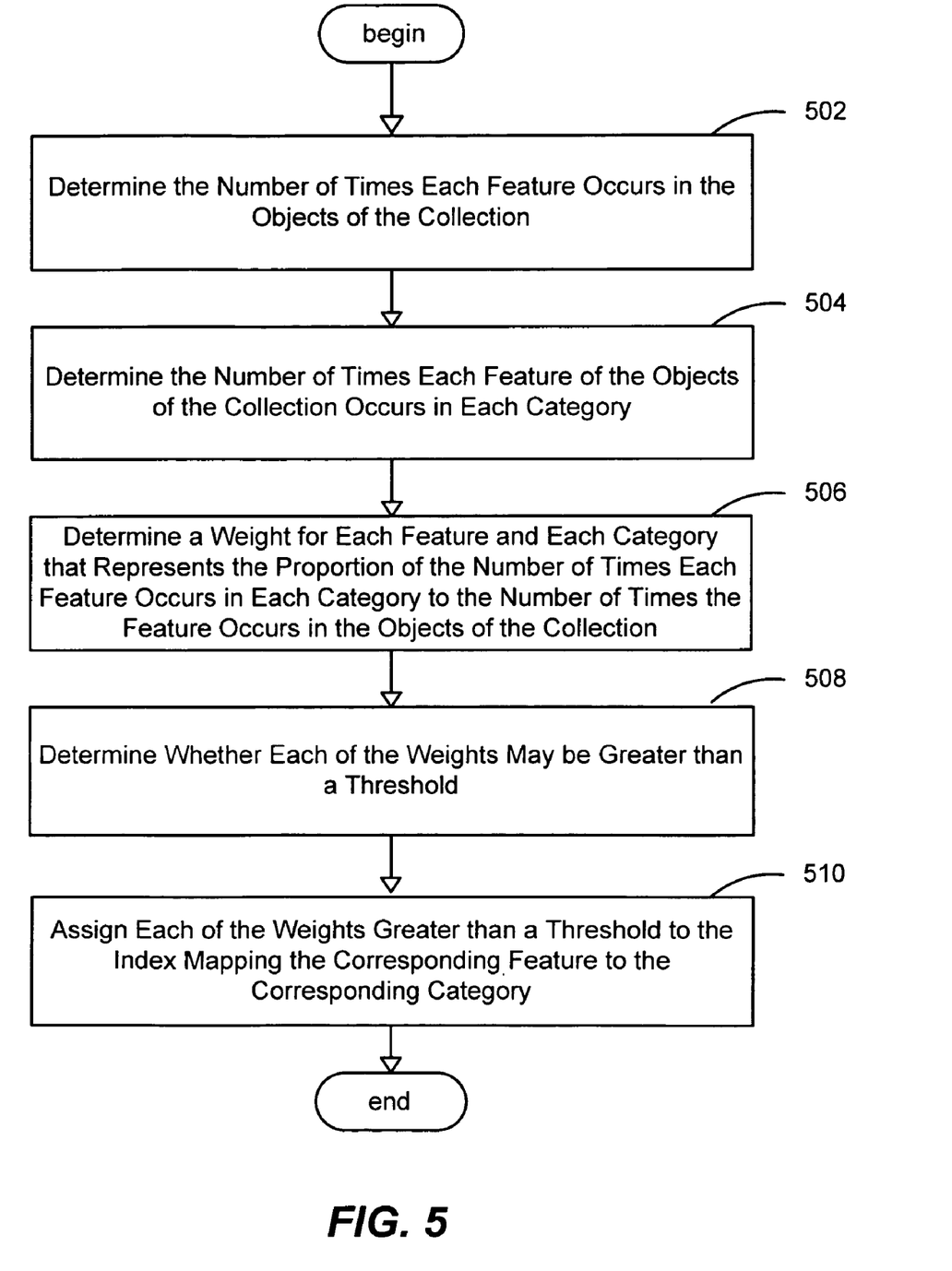
FIG. 5 is a flowchart generally representing the steps undertaken in one embodiment for updating weights in the index representing the mapping of features to categories for objects in the collection of objects, in accordance with an aspect of the present invention.

FIG. 5 presents a flowchart generally representing the steps undertaken in one embodiment for updating weights in the index representing the mapping of features to categories for objects in the collection of objects. In general, the following offline algorithm may be used in an embodiment for updating the weights in the index for each object:

---

Algorithm Offline(S,p) /* Offline algorithm */
1. For each instance x in training sample S:
    1.1 For each f ∈ x: /* increment counts for f */
        1.1.1 $n_f \leftarrow n_f + 1$
        1.1.2 For each category c∈$c_x$:
        1.1.2.1 $n_{f,c} \leftarrow n_{f,c} + 1$
2. Build the index: for each feature f and category c:

2.1 $$w \leftarrow \frac{n_{f,c}}{n_f} w.$$

2.2 If $w \geq p$, $w_{f,c} \leftarrow w$.

---

The offline algorithm may make an initial pass of the entire collection of objects, or a subset of the collection of objects, for use as a training sequence to learn the weights for each feature and each category in order to map features to categories in the index.

At step 502, the number of times each feature occurs in the objects of the collection may be determined. For example, a counter $n_f$ may be incremented in an embodiment for each feature as it may be seen in the training sequence of objects. At step 504, the number of times each feature of the objects of the collection occurs in each category may be determined. In an embodiment, a counter $n_{f,c}$, representing the combination of a feature f and a category c, may be incremented each time the feature may be seen to occur in the category in the training sequence.

A weight may then be determined at step 506 for each feature and each category that represents the proportion of the number of times each feature occurs in each category to the number of times the feature occurs in the objects of the collection. Thus, each feature may be treated independently and weights may be computed as proportions in an embodiment.

At step 508, it may be determined whether each of the weights may be greater than a threshold p. For efficient retrieval and saving of memory, the maximum feature out-degree in the index may be bounded to remain below some constant 1/p. To do so, the offline algorithm may drop feature-category weights below a certain parameter p in an embodiment. This may effectively bounds the out-degree to at most 1/p. The use of the threshold p>0 can also help the categorization accuracy of the learned index. The choice of p can be determined by testing the learned index on a portion of the training instances.

At step 510, each of the weights greater than a threshold may be assigned to the index mapping the corresponding feature to the corresponding category and processing may be finished for updating weights in the index. Those skilled in the art will appreciate that the offline algorithm may be modified to implement an online version in an embodiment by intermittently updating the index using the current counts as the sequence of objects in the collection of objects may be seen.

Figure 6:
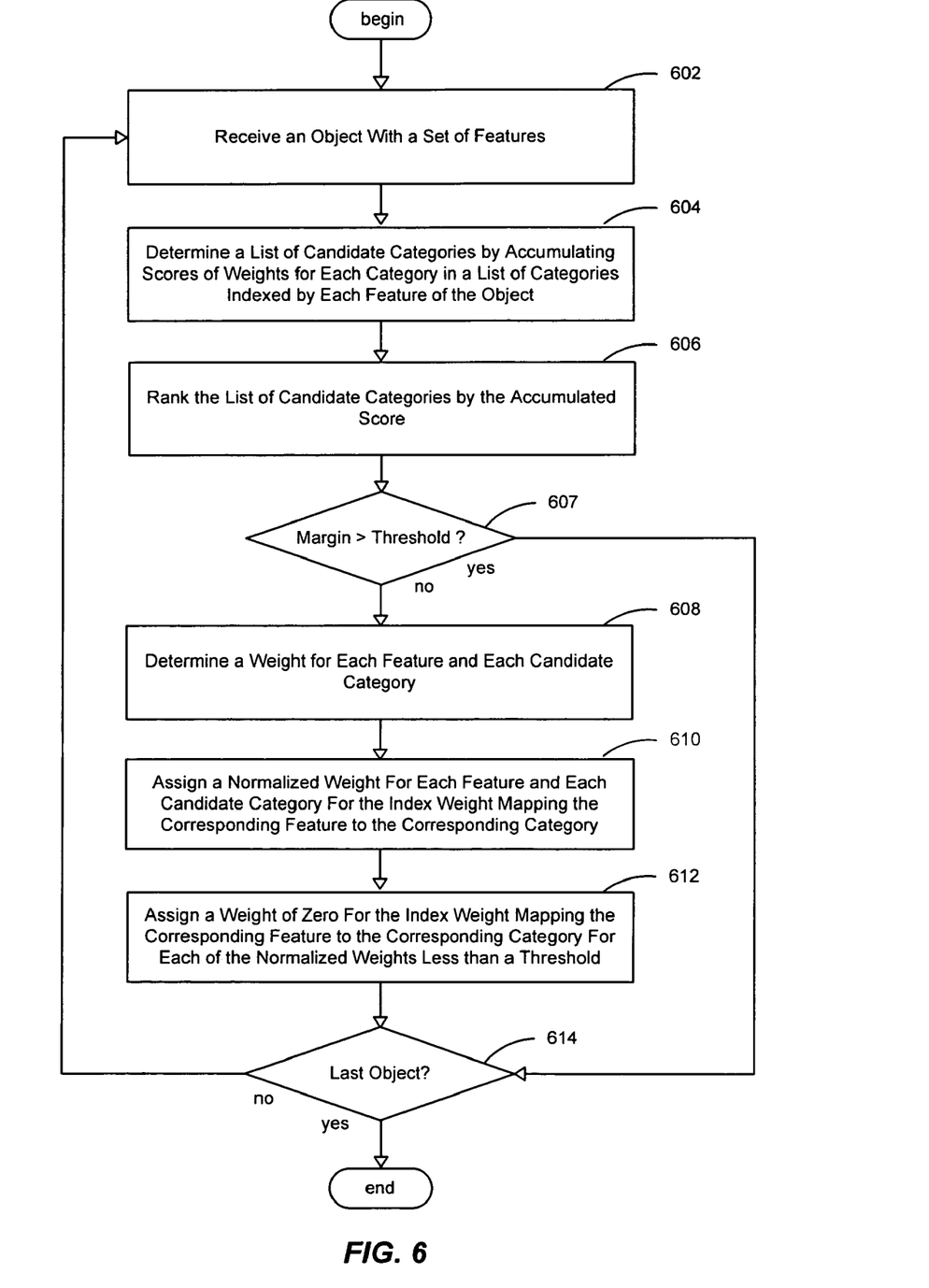
FIG. 6 is a flowchart generally representing the steps undertaken in an online embodiment for learning a weighted index mapping objects' features to categories, in accordance with an aspect of the present invention.

FIG. 6 presents a flowchart generally representing the steps undertaken in an online embodiment for learning a weighted index mapping objects' features to categories. In an embodiment, the following online algorithm may be generally used for dynamically learning a weighted index mapping objects' features to categories:

---
Algorithm Online(S, j) /* Online algorithm */
1.    For each instance x in training sample S:
     1.1   RankedRetrieval(x, j)
     1.2   If the margin criterion is met, do not update.
     1.3   Else, For each f ∈ x and category c ∈ $c_x$ with rank k:

1.3.1   $r \leftarrow \min\left(2, 1 + \frac{k}{10}\right)$,   $w_{f,c} \leftarrow w_{f,c} * r$       1.3.2   $\forall c, w_{f,c} \leftarrow \frac{w_{f,c}}{\sum w_{f,c}}$   /* normalize */

1.3.3   $\forall c$, if $w_{f,c} < 0.01$, $w_{f,c} \leftarrow 0$ /* drop small weights */

---

The online algorithm may or may not update the index on each training instance, and the amount that it updates may vary from one instance to another. Thus, the online algorithm may address the possible dependencies between features by attempting to improve ranking of the correct category(ies) on each training instance x. To do an update, the weights of the right category to each feature f∈x may be increased by multiplication (as shown above) or by addition, and the edge weights may be renormalized by the sum of the weights of categories currently connected to the feature. Normalization may in effect result in a reranking of the categories for that feature. The online algorithm may keep the out-degree bounded for each feature by dropping those edges with weight less than a threshold, such as 0.01. Thus, a feature may connect to at most 100 categories in an embodiment. If the category to be updated is not already connected to the feature f, then its weight is 0 and the online algorithm may initialize its weight to be r/2s, in case of multiplicative update, where s may be the sum of the current weights connected to feature f and r may be the learning rate.

In an embodiment for dynamically learning a weighted index mapping objects' features to categories, an object with a set of features may be received at step 602. A list of candidate categories may be determined at step 606 by accumulating scores of weights for each category in a list of categories indexed by each feature of the object. For each feature f in x in an embodiment, the corresponding edge weights of the highest weighted j categories connected to each feature may be added to a running total for each respective category. And the list of candidate categories may be ranked by their accumulated scores at step 606. In an embodiment, steps 604 and 606 may generally be implemented by the following algorithm for ranked recall of candidate categories using the index mapping features to categories:

---
Algorithm RankedRetrieval(x, j)
  1. , /* initialize category scores */
  2. For each feature f ∈ x:
     For the first j highest weight categories connected to f:
      2.1. $s_c \leftarrow s_c + w_{f,c}$ /* update accumulated scores */
  3. Sort the categories and return the ranked list of categories.

---

It may then be determined at step 607 whether a margin may exceed a threshold. The margin for the current instance may be defined as the difference between the score obtained by the top rank true category, $s_x$, and the score obtained by the top rank false category (a category that does not belong to training instance), $s'_x$. Either score can be 0. For example, if no true category is retrieved by the current index, the score for the top ranked true category may be 0. If it may be determined that the margin, $s_x - s'_x$, may exceed a threshold, then the index may not be updated and processing may continue at step 614. In an embodiment, the threshold may be a value such as 0.5 or 1.0. A better value for the threshold may be determined by experimenting with the categorization accuracy obtained on the training set.

If the margin may not exceed the threshold, then a weight for each feature and each candidate category may be determined at step 608. In an embodiment, with multiplicative update, the weight may be computed as $w_{f,c} * r$, where the learning rate, r, may be the minimum of (2,1+k/10), where k may be the rank of highest ranked true category of the instance, using the current index. In general, the learning rate may reflect how quickly feature-category weights may be promoted for mapping features to categories in the online algorithm. By promoting a feature-category weight, the category may be ranked higher for the next time the feature may be seen. If the learning rate may be too fast by promoting a feature-category weight that may be too high, the algorithm may appear less stable by reordering categories too quickly. With too slow of a learning rate, a feature-category weight may remain too low for any significant promotion that would influence reordering of categories. In an embodiment, 1<r<2 may be observed to be adequate. Note that even if the right category may be ranked first, still r>1 and the category's weight gets increased (if the margin criterion is not met) since r starts at 1.1 when the right category may be at rank 1, and goes up to 2. If the category's weight was not updated at rank 1, it would quickly loose its rank, when the second best category may be seen. The learning rate may be reduced as the rank of the true category may get closer to 1. By lowering the rate of promotion, appropriate weights may be obtained where there may be multiple features with dependencies, so that the right categories for different instances may be ordered accordingly.

Those skilled in the art will appreciate that other update policies may be applied for assigning weights for the index mapping features to categories. For example, in an alternative additive update algorithm, the weights may be increased by adding a promotion factor. A promotion factor of 1.0 may be adequate in various embodiments. If a category was not already connected to a feature, its weight may be initialized to 1.0.

At step 610, a normalized weight for each feature and each candidate category may be assigned to the index for the index weight mapping the corresponding feature to the corresponding category. Normalization may implicitly demote a weight and result in a reranking of the categories for that feature. At step 612, a weight of zero may be assigned to the index for the index weight mapping the corresponding feature to the corresponding category for each of the normalized weights less than a threshold. In an embodiment, the threshold may be 0.01 so that a connection to a category with a weight of less than 0.01 may be dropped, bounding each feature's connections to at most 100 categories.

At step 614, it may be determined whether the last object has been received. If not, then the next object may be received at step 602 and processing may continue. Otherwise, processing may be finished for learning a weighted index mapping objects' features to categories in an online embodiment. As may now be understood, the online algorithm may efficiently and accurately compute a mapping of a large number of features into in a large number of categories, without extensive memory requirements that may otherwise be necessary in the offline algorithm for computing proportions over a possibly unbounded sequence of objects by keeping track of counts for each category for each feature.

If confidence values, such as probabilities, for the recalled categories are desired, the scores of recalled categories can be normalized, for example divided by the sum of the scores of all the categories retrieved. An alternative can be to compute a mapping of scores to probabilities while training, such as by binning (segmenting) the range of scores and computing the proportion of the time that a category with score falling in a bin may be a true category. Those skilled in the art will appreciate that obtaining probabilities from scores can be achieved in any number of other ways.

Thus the present invention may accurately and efficiently compute an effective index that may be used to quickly identify a small set of candidate categories for a given instance, and may further provide a ranking of candidate categories enjoying both high recall, ie, for most or an adequate portion of the instances, the right categories are recalled, and high precision, ie, the top ranked categories tend to be correct categories for most or an adequate portion of the instances. Advantageously, the system and method may learn a weighted index for classifying objects using ranked recall either offline by training during an entire initial pass of a training sequence of a collection of objects or online by dynamically updating the weighted index as each instance of the collection of objects may be categorized. Large scale application with hundreds of thousands of categories, such as text categorization or word prediction applications, may use the present invention for categorizing an instance of an object from a large collection of objects. The method of the present invention has a number of advantages over exisiting methods, including significant memory and time efficiency advantages over methods that require training classifiers for each category, and flexibility and generality, for example over methods that require the categories to form a taxonomy.

As can be seen from the foregoing detailed description, the present invention provides an improved system and method for learning a weighted index mapping features of a collection of objects to a set of categories and providing a ranked recall of categories indexed by features of an object. Any collection of objects may have features mapped to categories and recalled by efficiently obtaining a good ranking of candidate categories by the present invention. Such a system and method may support many applications that may perform ranked recall using the weighted index to categorizing objects. As a result, the system and method provide significant advantages and benefits needed in contemporary computing.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A computer system for categorizing objects, comprising:
one or more processors; and
an index generator operably creating a weighted index using a collection of training objects;
wherein each training object comprises one or more features from a plurality of features and each feature has associated one or more categories from a plurality of categories;
wherein creating the weighted index includes:
determining associations between the plurality of features and the plurality of categories;
assigning weights to the associations;
wherein assigning weights to the associations includes assigning a weight value to each association of a plurality of associations involving a particular feature;
wherein each association of the plurality of associations is between the particular feature and a distinct category of the plurality of categories;
wherein the weight values assigned to the plurality of associations establish a ranked list of categories for the particular feature;
receiving an additional training object comprising a mapping between the particular feature and one or more categories from the plurality of categories;
dynamically updating at least one weight in the weighted index to reflect the mapping between the particular feature and the one or more categories;
creating an updated ranked list of categories for the particular feature that reflects the at least one weight;
outputting the updated ranked list of categories for the particular feature.

2. The system of claim 1 wherein the particular weight value is based, at least in part, on (a) a number of times the particular feature is associated with the particular category and (b) a number of times the particular feature occurs in the collection of training objects.

3. The system of claim 2, wherein the particular weight value is proportional to a ratio of the number of times the particular feature is associated with the particular category and the number of times the particular feature occurs in the collection of training objects.

4. A computer-implemented method for categorizing objects, comprising:
  creating a weighted index using a collection of training objects;
  wherein each training object comprises one or more features from a plurality of features and each feature has associated one or more categories from a plurality of categories;
  wherein creating the weighted index includes:
    determining associations between the plurality of features and the plurality of categories;
    assigning weights to the associations;
    wherein assigning weights to the associations includes assigning a weight value to each association of a plurality of associations involving a particular feature;
    wherein each association of the plurality of associations is between the particular feature and a distinct category of the plurality of categories;
    wherein the weight values assigned to the plurality of associations establish a ranked list of categories for the particular feature;
  receiving an additional training object comprising a mapping between the particular feature and one or more categories from the plurality of categories;
  dynamically updating at least one weight in the weighted index to reflect the mapping between the particular feature and the one or more categories;
  creating an updated ranked list of categories for the particular feature that reflects the at least one weight;
  outputting the updated ranked list of categories for the particular feature;
  wherein the method is performed by one or more processors.

5. The method of claim 4 wherein the particular weight value is based, at least in part, on (a) a number of times the particular feature is associated with the particular category and (b) a number of times the particular feature occurs in the collection of training objects.

6. The method of claim 5, wherein the particular weight value is proportional to a ratio of the number of times the particular feature is associated with the particular category and the number of times the particular feature occurs in the collection of training objects.

7. The computer-readable storage medium, storing one or more sequences of instructions, which when executed by one or more processors, cause the one or more processors to perform the steps of:
  creating a weighted index using a collection of training objects;
  wherein each training object comprises one or more features from a plurality of features and each feature has associated one or more categories from a plurality of categories;
  wherein creating the weighted index includes:
    determining associations between the plurality of features and the plurality of categories;
    assigning weights to the associations;
    wherein assigning weights to the associations includes assigning a weight value to each association of a plurality of associations involving a particular feature;
    wherein each association of the plurality of associations is between the particular feature and a distinct category of the plurality of categories;
    wherein the weight values assigned to the plurality of associations establish a ranked list of categories for the particular feature;
  receiving an additional training object comprising a mapping between the particular feature and one or more categories from the plurality of categories;
  dynamically updating at least one weight in the weighted index to reflect the mapping between the particular feature and the one or more categories;
  creating an updated ranked list of categories for the particular feature that reflects the at least one weight;
  outputting the updated ranked list of categories for the particular feature.

8. The computer-readable storage medium of claim 7, wherein the particular weight value is based, at least in part, on (a) a number of times the particular feature is associated with the particular category and (b) a number of times the particular feature occurs in the collection of training objects.

9. The computer-readable storage medium of claim 8, wherein the particular weight value is proportional to a ratio of the number of times the particular feature is associated with the particular category and the number of times the particular feature occurs in the collection of training objects.

10. The method of claim 4 further comprising determining a list of candidate categories by accumulating scores of weights for one or more of the plurality of categories indexed by at least one feature of an object.

11. The method of claim 10 further comprising ranking the list of candidate categories by the accumulated scores of weights.

12. The method of claim 4 further comprising determining a marginal weight for a feature and a category.

13. The method of claim 12 wherein determining the marginal weight for the feature and the category comprises determining a value between 0 and 1.

14. The method of claim 12 further comprising:
  normalizing the marginal weight for the feature and the category; and
  assigning the normalized marginal weight for the feature and the category to the index for the index weight mapping the feature to the category.

15. The method of claim 14 further comprising assigning a weight of zero to the index for the index weight mapping the feature to the category if the normalized marginal weight may be less than a threshold.

16. The method of claim 12 wherein determining the marginal weight for the feature and the category comprises calculating the product of a learning rate and a weight for the feature and the category.

17. The computer-readable storage medium of claim 7, further comprising instructions, which when executed by the one or more processors, cause the one or more processors to perform the step of determining a list of candidate categories by accumulating scores of weights for one or more of the plurality of categories indexed by at least one feature of an object.

18. A computer system for categorizing objects, comprising:
  means for creating a weighted index using a collection of training objects;
  wherein each training object comprises one or more features from a plurality of features and each feature has associated one or more categories from a plurality of categories;
  wherein means for creating the weighted index includes:
    means for determining associations between the plurality of features and the plurality of categories;

means for assigning weights to the associations;
wherein means for assigning weights to the associations includes means for assigning a weight value to each association of a plurality of associations involving a particular feature;
wherein each association of the plurality of associations is between the particular feature and a distinct category of the plurality of categories;
wherein the weight values assigned to the plurality of associations establish a ranked list of categories for the particular feature;
means for receiving an additional training object comprising a mapping between the particular feature and one or more categories from the plurality of categories;
means for dynamically updating at least one weight in the weighted index to reflect the mapping between the particular feature and the one or more categories;
means for creating an updated ranked list of categories for the particular feature that reflects the at least one weight;
means for outputting the updated ranked list of categories for the particular feature.

19. The computer system of claim 18, wherein the particular weight value is based, at least in part, on (a) a number of times the particular feature is associated with the particular category and (b) a number of times the particular feature occurs in the collection of training objects.

20. The computer system of claim 19, wherein the particular weight value is proportional to a ratio of the number of times the particular feature is associated with the particular category and the number of times the particular feature occurs in the collection of training objects.

* * * * *